INVENTOR
Gerhard Richter
By Watson, Cole, Grindle &
Watson
ATTORNEYS

Dec. 1, 1959  G. RICHTER  2,914,911
ARRANGEMENTS FOR CONTROLLING THE EFFECTIVE THRUST
PRODUCED BY REACTION-PROPULSION UNITS AND IN
PARTICULAR BY RAM-JET UNITS OR ATHODYDS
Filed Oct. 12, 1953  2 Sheets-Sheet 2
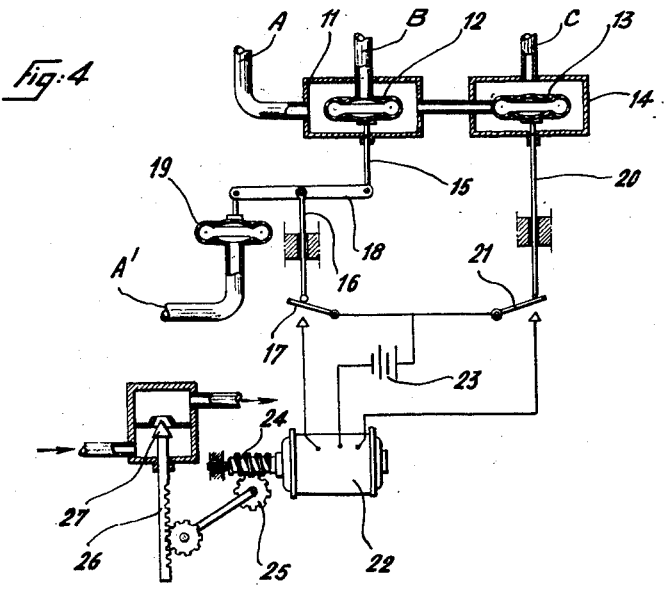
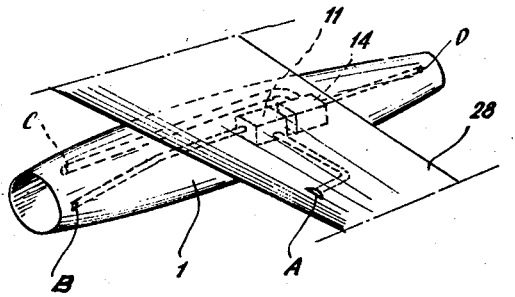
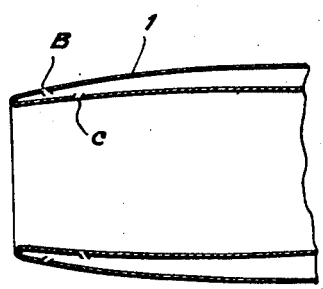

United States Patent Office 2,914,911
Patented Dec. 1, 1959

2,914,911

ARRANGEMENTS FOR CONTROLLING THE EFFECTIVE THRUST PRODUCED BY REACTION-PROPULSION UNITS AND IN PARTICULAR BY RAM-JET UNITS OR ATHODYDS

Gerhard Richter, Decize, Nievre, France, assignor to Societe Nationale d'Etude et de Construction de Moteurs d'Aviation, Paris, France, a company of France Application October 12, 1953, Serial No. 385,638

Claims priority, application France July 10, 1953

2 Claims. (Cl. 60—35.6)

The effective thrust produced by an engine installed in an aircraft, that is to say the thrust which can be used for the propulsion of the aircraft, is equal to the difference between the absolute thrust generated by the engine and the aerodynamic drag of the motor and its associated parts, that is to say the whole of the propulsion group.

In the particular case of ram-jet units, an increase in the quantity of fuel burnt in the combustion chambers has the effect of increasing the temperature of the gases, and thus at the same time their specific volume and, in consequence, the mass output passing through the discharge nozzle is reduced, the cross-section of the nozzle being fixed, mainly by reason of the difficulty of mounting devices for controlling the cross-section in a zone of gases which can attain a temperature as high as that of the gases discharged from a ram-jet unit.

Now, in the case of supersonic flight, the drag of a reaction unit increases very sharply when the quantity of air passing through the reaction unit reaches a value less than the value given by the shape of the inlet orifice of the reaction unit and the altitude, that is to say to the expression $\gamma_0 V_0 S_e$ in which $\gamma_0$ is the density of the surrounding air, $V_0$ is the speed of flight and $S_e$ is the material cross-section of the inlet opening of the reaction unit.

In fact, when the quantity of air passing through the ram-jet unit is equal to this value, there is produced within the interior of the inlet diffuser 1 of the ram-jet unit 2 (Fig. 1) a shock-wave 3 which, as it passes, brings down the quantity of air to a subsonic speed. Only the oblique shock-wave 4 which starts from the forward tip of the cowling has any influence on the external drag. The angle $\phi$ of this shock-wave with respect to the plane perpendicular to the direction of the flow increases, for the same profile of cowling, as the Mach number increases. If the output of air decreases in order to arrive at a value $\gamma_0 V_0 S_0$ which is smaller than $\gamma_0 V_0 S_e$ (Fig. 2), the extension of the lines of flow at the reduced section $S_0$ to the real section of the intake opening $S_e$ can only be effected through a shock-wave 5, which is in that case a frontal wave located at a certain distance in front of the forward extremity of the cowling.

The rise in pressure at the moment of the passage of the air through a shock-wave increases in magnitude as the angle $\phi$ of the wave, as defined above, is smaller. It follows that the pressures acting on the cowling of the ram-jet unit, that is to say the drag of the body of the cowling, are much greater in the case of Fig. 2, than in the case of of Fig. 1, the difference between the drag which corresponds respectively to these two cases, and which is zero for a Mach number equal to one, increases very rapidly with the Mach number. To this increase in drag due to shape, there must be added a drag due to the inlet which arises from an extension of the lines of flow of the section $S_0$ of reduced area to the real cross-section $S_e$.

The present invention has for its object to provide a method which enables the effective thrust produced by a reaction unit, and more particularly by a ram-jet unit, to be improved, which method consists in varying the amount of fuel delivered as a function of the position of the entry shock-wave, suitably detected, in such a way as to avoid the frontal shock-wave in front of the intake opening and to maintain the shock-wave partly within the interior of the diffuser and partly attached to the forward extremity of the cowling.

The detection of the position of the shock-wave may be effected by making use of the difference in pressure which exists in different zones of this wave, that is to say by measuring the pressure at points suitably spaced apart.

The invention may be extended, furthermore, to a device which enables the process to be carried out automatically, and which includes suitably placed sources of pressure as well as means for comparing the pressures given by these sources and for acting on the injection of fuel to the burners of the combustion chamber or chambers of the reaction unit.

The description which follows below with regard to the attached drawings (which are given by way of example only and not in any sense by way of limitation) will make it quite clear how the invention may be carried into effect, the special features which are referred to, either in the drawings or in the text, being understood to form a part of the said invention.

Fig. 4 is a diagrammatic view of an automatic arrangement for controlling the fuel, the device being associated with the sources of pressure.

Figs. 5 and 6 illustrate an alternative form of the arrangement of the sources of pressure and are respectively a view in perspective of an aircraft equipped with a ram-jet unit and an axial cross-section on a larger scale of the intake diffuser of the ram-jet unit.

Figure 3:
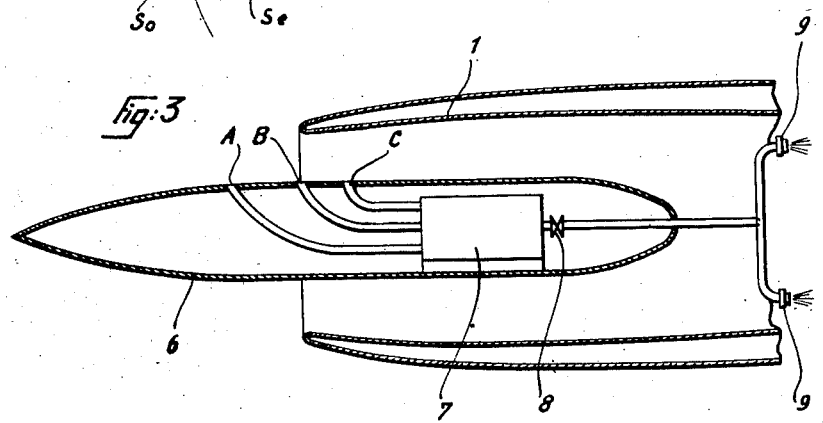
Fig. 3 is a view in cross-section of the intake opening of a ram-jet unit, and shows the arrangement of the pressure sources on a projecting pressure-sounding device or on a central body.

In the form of embodiment of the invention shown in Fig. 3, three sources of static pressure A, B, C, are suitably arranged in line along the path of the air passing into the intake diffuser 1 of the ram-jet unit of which only the forward portion has been shown. In the case in which the intake diffuser has an annular cross-section and comprises a central body 6, these sources of pressure may be arranged along the wall of this central body. These sources of pressure communicate with a control device 7 which acts on a valve 8 serving to control the supply of liquid fuel to the burners 9 installed inside the combustion chamber of the ram-jet unit. The details of a form of embodiment of the control device 7 are given in Fig. 4.

The source of pressure A communicates with a chamber 11 in which there is provided a pressure-capsule 12 connected to the source of pressure B. The source of pressure A communicates in addition, through the chamber 11, with the interior of a pressure-capsule 13 which is housed inside a chamber 14 connected to the source of pressure C. The expansions or contractions of the pressure capsule 12 are transmited to a rod 15 which passes through the wall of the chamber 11 and acts on a push-rod 16 which operates an electric contact 17. The connection between the rod 15 and the push-rod 16 is not direct but is made through the intermediary of a swingle-tree lever 18, one extremity of which is pivotally attached to the rod 15, an intermediate pivot being attached at a suitable point to the push-rod 16 and the other extremity being controlled by the expansions or contractions of a pressure-capsule 19 which is subjected to the dynamic pressure of flight from a Prandtl tube or similar member arranged at a convenient point of the aircraft on which the ram-jet unit is mounted.

The expansions and contractions of the pressure-capsule 13 are transmitted to a push-rod 20 which acts on an electric contact 21.

The electric contact 17 is located in a circuit which supplies the electric motor 22 from the source of current 23 in such a way as to cause this motor to rotate in one direction when the contact 17 is closed. In the same way, the contact 21 is included in another supply circuit of the motor 22, which causes this motor to rotate in the opposite direction when the said contact 21 is closed. The motor controls a needle-valve 27 located in the pipe which supplies the burners of the combustion chamber with fuel, the control being effected through a suitable gearing comprising, for example, an endless screw 24, a helicoidal wheel 25 and a toothed rack 26.

The pressure source A being located sufficiently far forward on the central body for the shock-wave of the air inlet opening to be always situated aft of the point A, there operating conditions are encountered depending on whether the shock-wave is situated between the sources of pressure A and B or between B and C or aft of C.

In the first case, the pressure in the chamber 11 and in the pressure-capsule 13 is smaller than the pressure in the capsule 12 and smaller than that in the chamber 14. The capsule 12 is thus expanded and the capsule 13 contracts. Only the electric contact 17 is thus closed (it is here supposed that the extremity of the swingle-tree lever 18 connected to the wall of the capsule 19 is fixed). The electric motor 22 thus rotates in the direction which tends to close the needle-valve 27 thereby reducing the supply of fuel. Because of this, the temperature and the specific volume of the gases discharged from the combustion chamber diminsh, and this, the cross-section of the discharge nozzle being fixed, causes an increase in the weight output and, in consequence, a greater speed of flow through the reaction unit. The shock-wave is then displaced towards the rear.

When the shock-wave arrives at a point between B and C, the pressure inside the capsule 12 becomes about the same as that in the chamber 11 and the capsule returns to its position of rest, opening the contact 17 as it contracts. The pressure within the interior of the capsule 13 being smaller than that in the chamber 14, this capsule remains contracted and the contact 21 remains open. The motor 22 thus stops as its electric supply has been cut off. The output of fuel will remain at the same value as long as the shock-wave is located between B and C.

If now the shock-wave passes aft of the point C, the pressure in the chamber 14 becomes the same as that within the interior of the capsule 13 and this capsule thus returns to the position of rest by expanding and thereby it closes the contact 21 so that the motor 22 rotates in the direction which tends to open the needle-valve 27 thus increasing the supply of fuel to be burnt. The temperature of the combustion chamber rises and so also does the output volume passing through the discharge nozzle. The speed of flow through the reactor tends to diminish thereby causing the shock-wave to move towards the front.

The control thus described tends to fix the shock-wave between the points B and C.

The most favourable position for the shock-wave is in the vicinity of the neck of the intake diffuser. The sources B and C may be placed on opposite sides of this neck and may be sufficiently close to each other to enable the shock-wave to be maintained at the optimum position.

It will not always be possible to arrange the sources of pressure A and B in such a way that the difference of pressure between these two sources shall be zero when the shock-wave is situated aft of the point B. It may happen, in fact, that during flight at a high Mach number and at low altitudes, with a shock-wave located, as it should be, aft of the point B, the difference of the pressures between A and B will have the same value as would be obtained in flight at a Mach number only a little higher than unity at high altitudes with the shock-wave situated forward of the point B. In other words, it may happen that when the shock-wave remains aft of the point B, the difference in pressure between A and B tends to increase when the speed of flight increases and/or when the altitude diminishes, the capsule 12 thus having a tendency to close the contact 17 through the push-rod 16 when this is not necessary.

This is obviated by causing the push-rod 16 to be acted upon, not by the difference of the absolute pressures between A and B but by the difference of the pressures referred to the dynamic pressure of flight, in such a way as to eliminate the influence of altitude and to reduce the influence of the speed of flight since the dynamic pressure increases as the speed of flight increases and/or as the altitude diminishes. It is for that purposes that the pressure capsule 19 communicates through A' with a Prandtl tube or similar device for measuring the dynamic pressure at a suitable point on the aircraft. The capsules 22 and 19 are connected to the opposite extremities of the swingle-tree lever 18. For a constant dynamic pressure, the extremity of the lever 18 which is connected to the capsule 19 constitutes a fixed point. On the contrary, when the dynamic pressures varies due to variation of the speed of flight and/or of the altitude, the capsule 19 causes the corresponding extremity of the lever 18 to move in a direction opposite to that which the capsule 12 tends to impart to the corresponding extremity of the lever 18, in such a way that the push-rod 16 and the switch 17 remain inactive when the shock-wave itself remains aft of the point B.

In the case of a ram-jet unit which has no central body, the source of pressure A may be arranged at the extremity of a pressure-sounding device which projects forward of the intake opening and the sources of pressure B and C are also arranged on pressure sounders or may alternatively be mounted on the internal wall of the intake diffuser 1.

The sources of pressure may also be arranged in a different way, in particular if the small thickness of the cowling does not permit of convenient installation of the source of pressure B which is that nearest to the forward point of the cowling.

Figure 1:
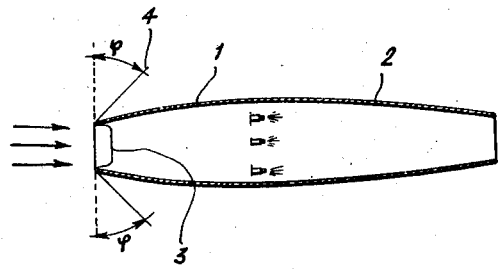
Figs. 1 and 2 are explanatory figures which have already been referred to in the preamble to the present description.
Figure 2:
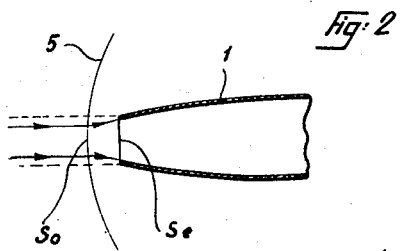

Referring, for example, to Figs. 5 and 6, the source of pressure B may be arranged on the external surface of the cowling at a point somewhat to the rear of the intake. At such a point, the increase in pressure which results from the presence of a shock-wave at the intake opening, such as the wave 4 of Fig. 1, is not very great whilst it is very great in the case of a frontal shock-wave such as that of Fig. 2. With a source of pressure arranged in this way, there may be associated a source of comparative pressure A placed at a suitable point, for example on the back of a wing 28 of the aircraft propelled by the ram-jet unit. These sources of pressure A and B may be respectively connected as in the case of Fig. 4, to a chamber 11 and to a pressure capsule 12 in such a way as to operate an electric contact similar to the contact 17 and having the same function. In the case in which a frontal shock-wave is encountered, the pressure at B, which is very much greater than the pressure at A, will cause an expansion of the capsule 12 and in consequence a closure of the contact 17 so that the motor 22 will act to reduce the supply of fuel. On the other hand, in the case of a shock-wave attached to the forward point of the cowling (and, in consequence, of a shock-wave inside the air inlet opening), the pressures at A and B will be about the same and the contact 17 will be opened.

Figure 7:
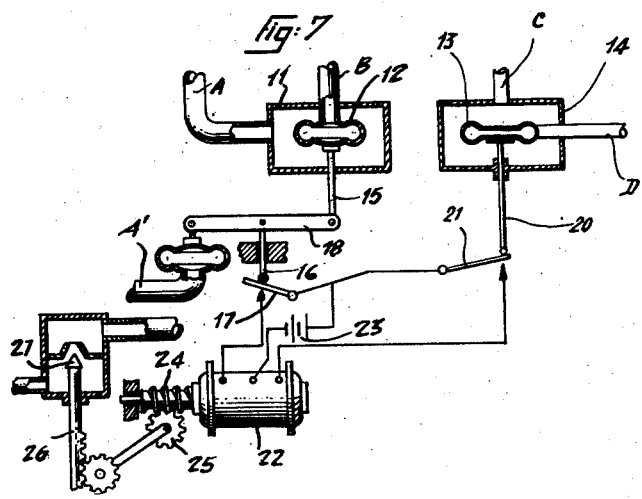
Fig. 7 shows an alternative form of the control device applicable to the cases of Figs. 5 and 6.

If it is desired to complete the control by regulating the position of the wave inside the air inlet opening, in such a way that this wave also remains as close as possible to the smallest section, that is to say to the neck of this diffuser, there may be provided a source of pressure C on the internal wall of the diffuser. It would be an advantage to associate with this source C a comparative source of pressure D other than A. This source D may be situated, for example, on the exterior of the cowling of the reaction unit close to the rear portion of this cowling. The source C would communicate with the interior of the chamber 14, and the source B with the interior of the pressure capsule 12, which is completely separated from A (Fig. 7). In the case in which the shock-wave is located forward of the source C, the pressure at C is stronger than that at D and the capsule 13 is contracted leaving the contact 21 open. If, on the other hand, the shock-wave passes to a point aft of C, the pressures at C and D are equivalent and the capsule 13 closes the contact 21 as it expands so that the motor 22 is caused to rotate in the direction which increases the supply of fuel.

It will be self-evident that modifications may be made to the form of embodiment which has just been described, in particular by the substitution of equivalent technical means without thereby departing from the spirit or from the scope of the present invention.

What I claim is:

1. In a ram-jet unit designed to travel at supersonic speeds and having an air intake, a combustion chamber downstream of said intake, piping means for supplying fuel to said chamber, and a fuel valve in said piping means for controlling the flow of fuel therethrough, a fuel valve control device responsive to the position of the inlet shock-wave formed when said unit travels at supersonic speeds, said device comprising two longitudinally spaced static pressure taps at said intake at both sides of a selected location of said inlet shock-wave, a third static pressure tap at a point remote from said two taps, and at which point the pressure is not substantially affected by any displacement of said inlet shock-wave, means for detecting any substantial differential pressure between the third tap and each of the two first-mentioned taps, and transmission means connected between said detecting means and said fuel valve to decrease the fuel supply when the pressure at each of the two first-mentioned taps is substantially greater than the pressure at the third tap, to increase the fuel supply when the pressures at the three taps are not substantially different from each other, and to leave the fuel supply unchanged when the pressure at that tap which is located downstream of said selected location is substantially greater than the pressure at the third tap while the pressure at the other of the two first-mentioned taps is not substantially different from the pressure at the third tap.

2. Device as claimed in claim 1, comprising further a dynamic pressure tap sensitive to variations in altitude and flying speed and connected with the transmission means to facilitate action thereof towards decreasing the fuel supply when the dynamic pressure decreases and to hinder said action when the dynamc pressure increases.

References Cited in the file of this patent

UNITED STATES PATENTS

| | | |
|---|---|---|
| 2,512,790 | Cleveland | June 27, 1950 |
| 2,540,594 | Price | Feb. 6, 1951 |
| 2,638,738 | Salter | May 19, 1953 |
| 2,729,061 | Grafinger et al. | Jan. 3, 1956 |
| 2,796,730 | Lawrence | June 25, 1957 |